March 2, 1971     W. HAAS     3,567,273
SPECIAL VEHICLE FOR FIGHTING DAMAGES IN TERRAINS
CONTAMINATED WITH ABC SUBSTANCES
Filed Nov. 17, 1966     4 Sheets-Sheet 1

INVENTOR
WILLY HAAS
BY
ATTORNEYS

INVENTOR
WILLY HAAS

3,567,273
Patented Mar. 2, 1971

3,567,273
SPECIAL VEHICLE FOR FIGHTING DAMAGES IN TERRAINS CONTAMINATED WITH ABC SUBSTANCES
Willy Haas, Nellingen, Germany, assignor to Daimler-Benz Aktiengesellschaft, Stuttgart-Unterturkheim, Germany
Filed Nov. 17, 1966, Ser. No. 595,180
Claims priority, application Germany, Nov. 17, 1965, D 32,298
Int. Cl. B60r 23/00
U.S. Cl. 296—24    10 Claims

ABSTRACT OF THE DISCLOSURE

A vehicle for use in areas contaminated with atomic, biological and chemical substances or war materials, having a driver cab provided with built-in communication equipment and devices for determining radiation levels existing in the immediate environment of the vehicle, a center section having radiation-measuring apparatus and one or more devices for cleaning contaminated persons or objects, and a rear body section having water tanks, pumps and other necessary equipment.

---

The present invention relates to a motor vehicle, and more particularly, to a special type of motor vehicle for fighting damages in areas contaminated with ABC (Atomic, Biological and Chemical) substances or war materials.

After use of ABC war materials and weapons, especially with the utilization of nuclear weapons, considerable difficulties arise for the operational teams of the different Civil Defense organizations, which, under certain circumstances, may be connected with health hazards of permanent nature or even danger to life.

The radiating particles which, for example, with a radioactive precipitation, settle on the terrain as well as on human beings, equipment, and materials, are dangerous above all, because, in contrast to chemical and biological war materials, they cannot be changed by chemical action or cannot be made harmless by similar measures. After a radioactive precipitation or settlement, one has to await either the natural radiation decay or one has to accept a radiation of the operational forces, self-protection equipment and vehicles up to a certain degree. After a completed operation or mission under these conditions, human beings and material, however, have to be subjected without delay to a thorough cleansing and decontamination.

In order to be able to undertake this decontamination as direct as possible at the place of operation, a movable, special operational force or team is needed which is equipped with corresponding apparatus, decontamination means and agents, etc., that are best accommodated and stored on a vehicle. After use of chemical and biological war materials, these special forces or teams should also be in a position to carry out a disinfection or decontamination directly at the place of operation.

The installations of the special vehicle furthermore have to make it possible that the operational forces can be examined after the decontamination with appropriate radiation-measuring apparatus and an evaluation of the personal radiation dose can be undertaken in the individual case. The extent of the determined radiation of an operational force determines the further use thereof. Strongly radiated persons have to be submitted immediately to an antiradiation treatment and have to be clothed freshly by means of available clothing reserves.

It should also be noted that such a vehicle is neither intended nor is it able to replace a stationary radiation-decontamination and disinfection installation through which a large number of human beings can be steered. Such a vehicle, instead, is to have the task to carry out directly at the place of operation a pre-contamination on persons and equipment.

Consequently, a special vehicle in accordance with the present invention will be used in action wherever ABC measuring and detection teams, rescue and salvage forces as well as medical and firefighting troops have to carry out their service in the rescue operations of human lives.

An ABC special vehicle which is able to carry along large water supplies and therewith is also able to assure a decontamination of persons under difficult conditions is necessary especially for the Civil Defense services of the communities and of the industry. In particular, such a type of vehicle should form part of the standard equipment of each modern firefighting department with a view to the general Civil Defense measures.

Accordingly, there is proopsed according to the present invention a special vehicle for fighting damages in terrains and areas contaminated with ABC materials which is characterized in that its body is composed of the following structural groups:

(a) A driver cab or section with built-in communication apparatus and installations for measuring the radioactive radiation prevailing outside the driver cab;

(b) A center body section which includes a control space with radiation-measuring apparatus and at least one space separate therefrom for cleaning persons or objects which have been contaminated by radioactive material, whereby the doors of these spaces are arranged on opposite sides of the vehicle;

(c) A rear body section separate from the center body section and having at least one water tank, the associated pump installations and spaces for further equipments and objects.

Accordingly, it is an object of the present invention to provide a special Civil Defense vehicle for fighting damages in terrains and areas contaminated by atomic, biological or chemical war materials, which is simple in construction and effective in operation, yet avoids the shortcomings and drawbacks encountered by the prior art constructions.

Another object of the present invention resides in a special vehicle greatly increasing the safety to the operational personnel used in decontamination as well as rescue operations within terrains contaminated by ABC warfare.

A further object of the present invention resides in a special operational vehicle for use by operational teams and forces which permits decontamination, in situ, of the operational forces as well as of the equipment used by same.

Another object of the present invention resides in a Civil Defense operational vehicle, greatly increasing the safety of its personnel against radioactive hazards.

Still another object of the present invention resides in a special type vehicle for operational use in decontamination operations which is simple in construction and offers maximum versatility in its use A still further object of the present invention resides in a special operational type vehicle for use in areas subjected to atomic, biological or chemical warfare which not only affords high effectiveness in decontamination operations and rescue missions but also provides a water supply for operational as well as drinking purposes safeguarded to the greatest possible extent against radiation or other contaminating influences existing on the outside of the vehicle.

These and further objects, features, and advantages of the present invention will become more obvious from the following description when taken in connection with the accompanying drawing, which shows, for purposes of illustration only, one embodiment in accordance with the present invention, and wherein.

Figure 1:
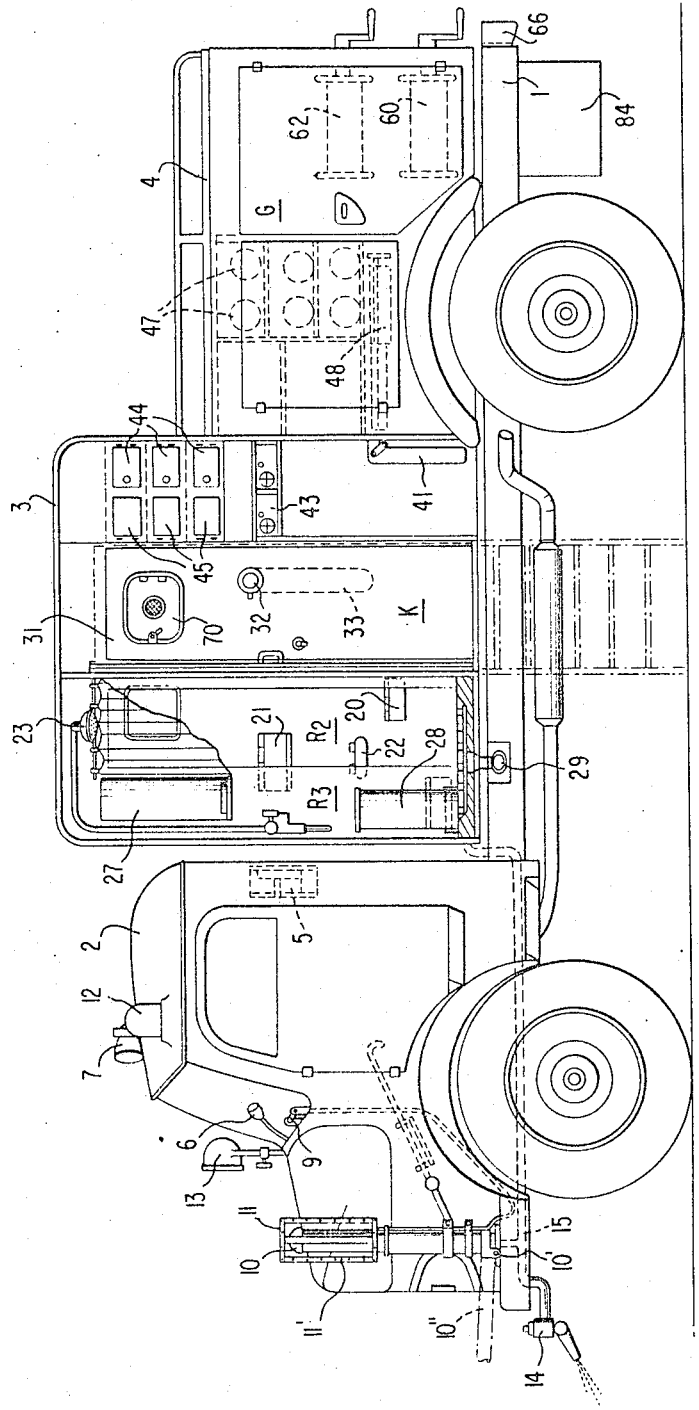
FIG. 1 is a side elevational view, partially in cross section, of a special type vehicle in accordance with the present invention.

Referring now to the drawing wherein like reference numerals are used throughout the various views to designate like parts, and more particularly to FIG. 1, the vehicle body arranged on the vehicle frame or chassis 1 of the special type vehicle consists of the driver cab section 2, of a center boxlike body structure and of a rear body structural section 4 separated from the center body structure 3.

The apparatus necessary for two-way radio communication are located in the driver cab section 2, and more particularly a radio-telephone transmitter 5 for the direct radio telephone connection with the Civil Defense direction, a microphone 6 and an outside loudspeaker 7 for announcing instructions from the Civil Defense direction and a radio apparatus 8 (FIG. 2) for receiving the official announcements in case of operation of the vehicle during longer periods of time. A radiation dose meter 9 of conventional construction which may be used either as stationary or portable apparatus together with the usual associated external measuring probe 10 and the decontamination shower or spray device 11 measrues during the drive and during standstill the radioactive radiation at the prescribed measuring height. The measuring probe 10 is for that purpose pivotally secured about a joint 10′ and can be pivoted, for example, up to the position 10″ thereof. The decontamination shower or spray 11 essentially consists of four pipe pieces 11′ which are provided with apertures pointing in the direction toward the measuring probe 10 and of two pipe rings located at the upper and lower end of the pipe pieces 11′ which connect the pipe pieces 11′ with each other. Water can be sprayed, controlled from within the driver cab, by way of a pressurized water connection against the measuring probe 10 out of the apertures of the pipe pieces 11′, whereby the measuring probe 10 is mounted in the center of the decontamination shower or spray device.

Figure 2:
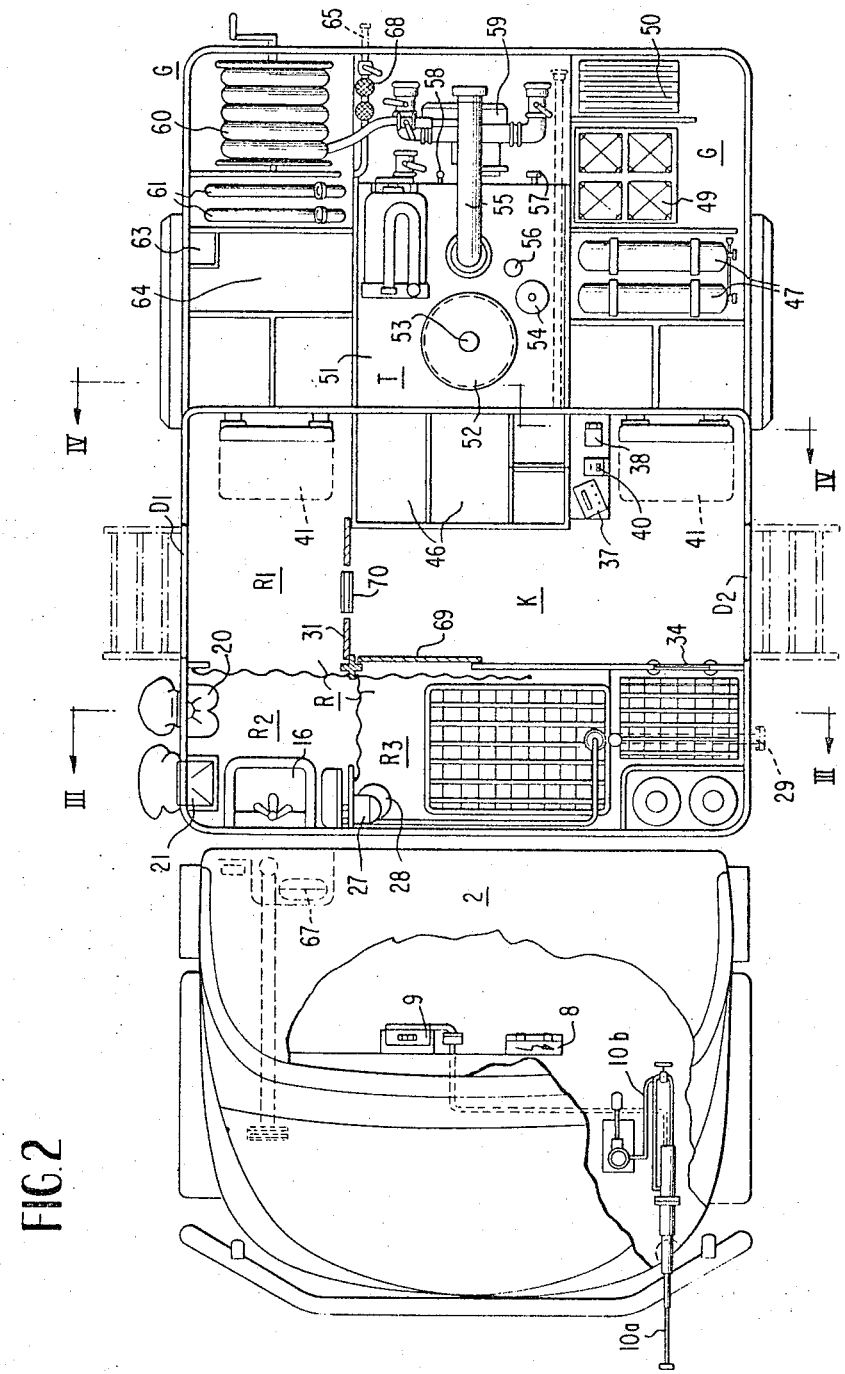
FIG. 2 is a top plan view, also partially in cross section, on the special type vehicle of FIG. 1.
Figure 4:
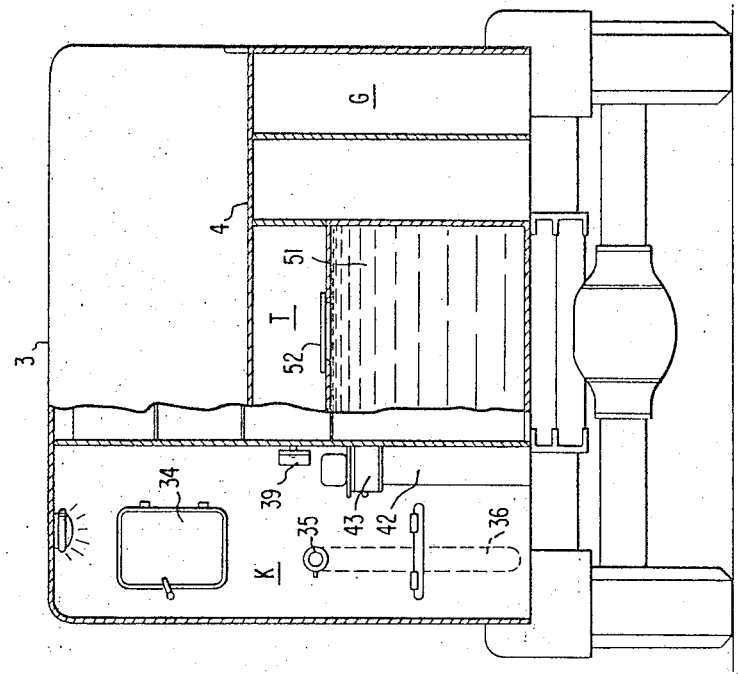
FIG. 4 is a cross-sectional view taken along line IV—IV of FG. 2.
Figure 3:
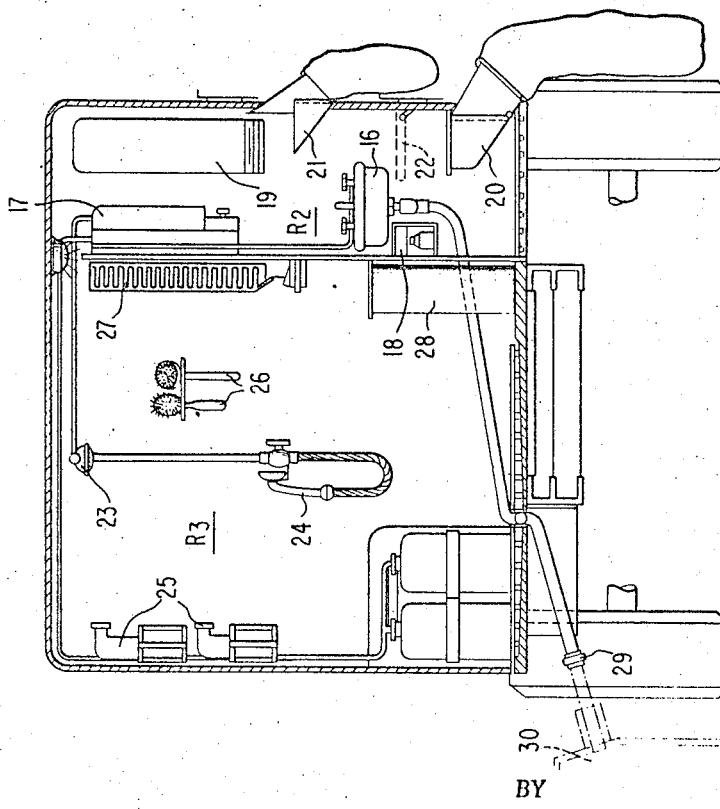
FIG. 3 is a cross-sectional view, taken along line III—III of FIG. 2.

Instead of the measuring probe 10 of FIG. 1 or in addition thereto, a further measuring probe 10a may be provided which, as visible in FIG. 2, is arranged within the vehicle body and can be telescopically extended through an aperture in the vehicle body, indicated in dash line, either manually or by conventional automatic adjusting means by way of pressure medium lines 10b or the like. Intermittently operable or blinker-type spotlights 12 as well as spotlights 13 for search and working area illumination form part of the equipment of the vehicle in addition to the conventional headlights for the road. A water flushing spray device 14 is located at the front end of the vehicle as special equipment which may serve both for the predisinfection as also for the road decontamination after radioactive precipitations. The water flushing shower or spray device 14 may be controlled from within the driver cab section, for example, by means of compressed air. The shower or spray device 14 is connected with a water tank by way of a pipe line 15. The driver cab section 2 includes as further special equipment a conventional protective air installation 67 for ABC operational use, which is of the type permitting connection of gas masks worn by the operating personnel to a system of supply bottles or tanks containing respirable air.

The center body section 3 of the vehicle is intended for the decontamination of persons, especially of civil-defense operational forces. The center body section 3 contains one cleaning space R consisting of several sections separated by curtains and of a supervisory and control space K. The persons of the contaminated operational force enters by way of an ante-space or ante-room R1 a wash space R2 in which is provided a wash basin 16 with hot and cold water, a continuous heater unit 17 operated by propane gas, a washing-agent container 18, a towel dispenser 19 as well as one ejector flap 20 and 21 for radioactive clothing and for irradiated waste, respectively. A folding seat 22 is arranged below the ejection flap 21 for the radioactive waste.

The anteroom R1 and the control space K are reachable from the outside by way of doors D1, D2 which are arranged on mutually opposite vehicle sides.

A shower may be taken within a shower space R3 separated from the wash space R2 by a curtain. A ceiling shower 23 and a hand shower 24 as well as decontamination means 25 and cleaning equipment 26 located within the space R3 permit a thorough washing. A towel dispenser 27 as well as an interchangeable waste container 28 are located in the shower room R3 for the completion of the equipment. The drain water discharged from the wash basin 16 and the showers 23 and 24 is conducted toward the outside by way of a common discharge pipe up to a pipe connection 29. From there, the discharge or drain water is conducted either into drainage ditches or into flowing water, or possibly are filled into a special tank 30 carried along by the vehicle and are thereafter transported away.

The supervisory and control space K which is separated from the remaining spaces of the decontamination installation by tightly closable sliding doors 31 and 69, is provided as operating room for a specially trained supervisory expert. The control space K is in visible connection with the anteroom R1 by way of a control window 70 built into the sliding door 31. Furthermore, a measuring aperture 32 is provided in the sliding door 31 which permits by means of a hose 33 made of transparent synthetic plastic foil material and arranged on the side of the anteroom, the extension of measuring apparatus from the control space K without coming into contact with the contaminated or irradiated person. A similar installation, i.e., an observation window 34 as well as a measuring aperture 35 with a plastic hose 36 are located in the separating wall between the control space K and the shower room R3. The result of the decontamination may be accurately controlled in this manner whereby the operating personnel is far-reachingly protected by the safety zone created in the control space K.

A radiation-dose output-measuring device 37 of conventional construction with a signaling installation, a glass dosimeter evaluation apparatus 38 for determining the received personal dose, a pocket dosimeter charging apparatus 39 as well as a control book 40 into which all of the events and measuring data are entered, are disposed in the control space K for carrying out the radiation measurements. A folding seat 41, mounted in front of a built-in table 42 enables the supervisory personnel to undertake the required written work.

Medical material 43 for the first aid is located in the two drawers of the table 42. ABC drugs as well as special decontamination agents are accommodated in shelves 44 which are of the type adapted to be closed and locked. Several lockable shelves 45 and 46 are built-in into the rearwardly disposed portion of the control space K and of the anteroom R1 as viewed in the direction of the drive, for the storage of cleaning agents and reserve clothing.

Various apparatus, tools and equipments for the operational team or force are accommodated in the rear body section 4 of the vehicle as shown in FIGS. 1 and 2, for example, oxygen apparatus 47 for the protection against breathing in radioactive dust, an apparatus 48 for the preparation of drinking water, detection and decontamination substances in spray boxes 49, synthetic plastic bags and clothing bags 50. The tank space T contains a nondrinkable water tank 51 with ingress aperture 52, an underpressure valve 53, an excess pressure valve 54, a filler pipe with excess pressure valve 55, a heating body 56 adapted to be screwed in, a thermostat 57, a water level indicator 58 as well as the necessary pumping installation 59 for the central water supply for the decontamination installation, the shower or spray devices, the high pressure reel or winch and the spray hose.

A portable compressed-air sprayer device 71 for the decontamination of the apparatus of the vehicle, especially also for cleaning the vehicle understructure or underchassis and the engine space is accommodated in the tank space T.

For purposes of preparation of the nondrinkable water contained in the tank 51, interchangeable water preparation filters 68 of any conventional type are installed in the tank space T.

In case of need, for example, for emergency water supply in case of catastrophic events, the entire content of the nondrinkable water tank 51 can be pumped through the filters 68, can thus be filtered and then be used as drinking water.

A high pressure hose 60 for the road and surface decontamination after radioactive precipitation as well as for carrying out rapid firefighting action and four C-extension hoses 61 are accommodated in the equipment shelf G.

The water needed for the apparatus and vehicle decontamination is taken off from a spray hose 62 which is also accommodated in the apparatus shelf G on a separate reel.

The apparatus shelf G further contains an ABC marking apparatus 63 of any conventional type which serves during operational use of the vehicle as measuring and detecting vehicle for the marking of radioactive places as well as after decontamination of the persons for the marking of deposited radioactive clothing and radioactively contaminated drainage places.

Since a large requirement in nondrinkable and drinkable water exists with all operational uses in an area hit by a catastrophe, a drinking water tank 64 is also accommodated in the apparatus shelf G in addition to the already present nondrinkable water tank 51. The drinking water takeoff place 65 can be seen in FIG. 2.

In case of need, especially for the decontamination of larger road surfaces and the like, for example, a tank wagon trailer may be coupled to the coupling 66.

Figure 5:
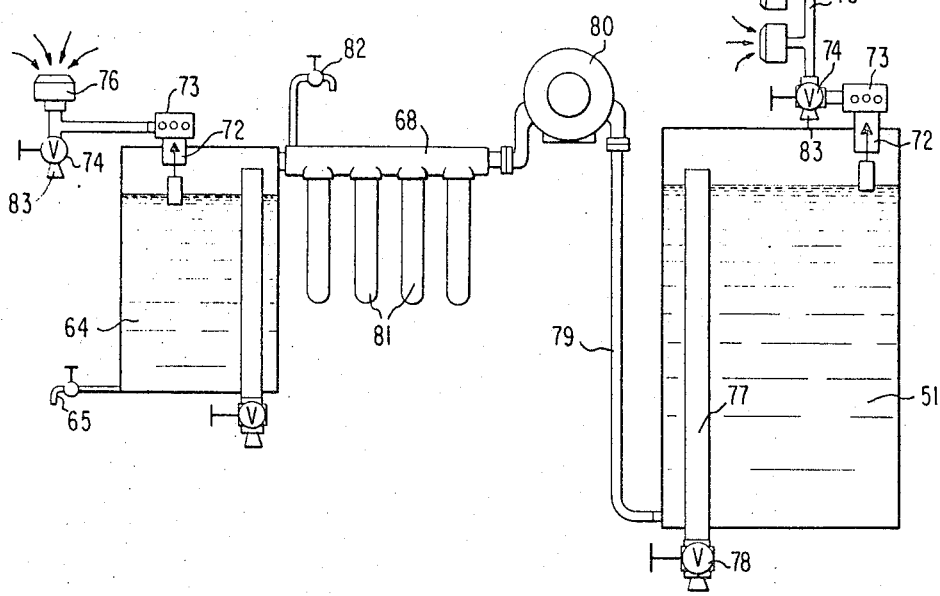
FIG. 5 is a schematic view of the arrangement of the nondrinkable water tank and of the drinkable water tank.

As may be seen from FIG. 5, the nondrinkable water tank 51 (FIG. 2) is provided with a float valve 72 which closes the connection to a connecting piece 73 with a filled tank. On the connecting piece 73 is seated a closure valve 74 which is connected by way of a distributor piece 75 with several ABC filters 76 on any conventional construction and by way of the short connecting piece 83 with the free atmosphere. Furthermore, an overflow pipe 77 is provided in the nondrinkable water tank 51 which is adapted to be closed off by means of a closure valve 78.

The nondrinkable water tank 51 is connected by way of a suction line 79 with a water pump 80, which, in case of need, supplies water from the nondrinkable water tank 51 by way of the filter unit 68 provided with conventional ceramic filter plugs 81 to the drinkable water tank 64. Sterilized drinking water can be taken off either directly to the rear of the filter unit 68 by way of a discharge cock 82 or can be collected in the drinking water tank 64 and from there withdrawn by way of the discharge line 65.

Like the nondrinkable water tank 51, the drinkable water tank 64 is also provided with a float valve 72, a connecting piece 73, a closure valve 74 and conventional ABC filters 76. During ABC protective-air ventilation the closure valves 74 are closed both at the nondrinkable as well as the drinkable water tank in case of actual emergency which closure valves 74 enabled prior thereto the free inlet of atmospheric air into the respective tanks by way of the corresponding connecting pieces 83. In case of water removal from the tanks, the air now flowing into the tanks has to pass through the ABC filters 76. As a result thereof, no contaminated air can penetrate into the tank interior.

Figure 6:
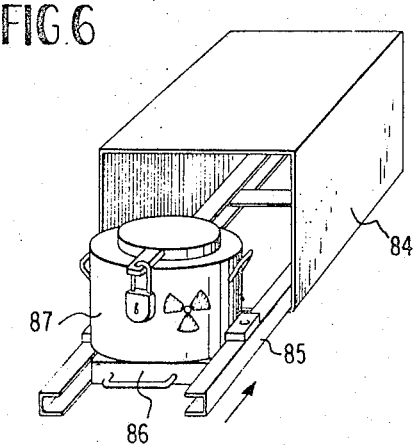
FIG. 6 is a perspective view of the isotope salvage or disposal installation, carried along by the vehicle.
Figure 7:
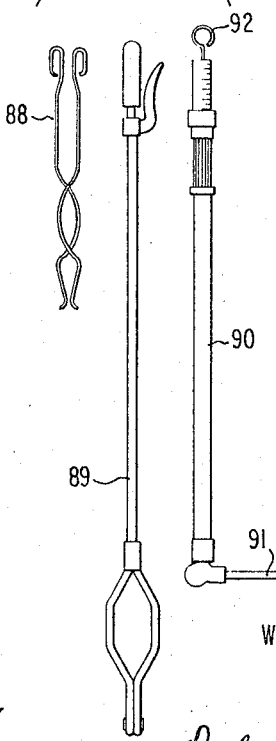
FIG. 7 is an elevational view of a number of apparatus used for disposal of radioactive material.

An installation for the isotope storage and eventual disposal is also accommodated at the vehicle in accordance with the present invention as shown in FIG. 6 which consists of a steel container 84 that is secured, for example, in the rear of the vehicle (FIG. 1) at the vehicle frame 1. A lead container 87 arranged in the steel container 84 is displaceable on glide rails 85 by means of a carriage 86; the lead container 87 is adapted to be locked and is portable. For purposes of handling and dispensing solid radioactive objects or preparations, the remote gripping tongs 88 and 89, illustrated in FIG. 7, and taken along in the apparatus space G are used while for purposes of dispensing liquid preparations the pipette device 90 is used which enables the sucking-in of liquid media through the pipette 91, for example, by means of a suction piston arranged on the inside which is adapted to be reciprocated by means means of the handle knob 92.

A vehicle constructed and equipped in this manner may also be used as a completely satisfactory fire-extinguishing vehicle for fighting starting fires.

The vehicle in accordance with the present invention may take over important tasks at any time in case of emergencies as bringer or feeder of drinkable or nondrinkable water as well as transportation means for equipment and apparatus.

Decisive, however, is the use of the special type vehicle as complete ABC decontamination installation for persons which can also be put into operation during the winter without any limitation and which, if necessary, may also be used temporarily as stationary installation.

While I have shown and described one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications.

I claim:

1. A special vehicle for operation in areas contaminated with atomic, biological or chemical war materials, comprising multisectional vehicle body means, including driver compartment body means, center body structure means and rear body structure means, said driver compartment body means including radio-communication means and measuring means for measuring the level of radiation prevailing on the outside of the driver compartment body means, said center body structure means including at least one control space means equipped with radiation measuring apparatus and at least one further space means separated from said control space means for the cleaning of persons and objects which have been exposed to radiation and contamination, each of said space means being provided with respective door means leading to the exterior of said vehicle body, and said rear body structure means being separated from the center body structure means and including at least one water tank means, pump means operatively connected with said water tank means and spaces for additional equipment, and further comprising aperture means between said further space means and said control space means and tubular elements disposed adjacent said aperture means on the side of said further space means, wherein said radiation-measuring apparatus includes measuring probes which can be introduced into said further space means through said apertures and adjacent tubular elements.

2. A special vehicle for operation in areas contaminated with atomic, biological or chemical war materials, comprising multisectional vehicle body means, including driver compartment body means, center body structure means and rear body structure means, said driver compartment body means including radio-communication means and measuring means for measuring the level of radiation prevailing on the outside of the driver compartment body means, said center body structure means including at least one control space means equipped with radiation measuring apparatus and at least one further space means separated from said control space means for the cleaning of persons and objects which have been exposed to radiation and contamination, each of said space means being provided with respective door means leading to the exterior of said vehicle body, and said rear body structure means being separated from the center body structure means and including at least one water tank means, pump means operatively connected with said water tank means and spaces for additional equipment, further comprising ejection flap means disposed in an outer wall of said further space means for the dispensing of radioactively-contaminated objects, and interchangeable container means arranged on the outside of the vehicle below said flap means for receiving said contaminated objects therein.

3. A special vehicle for operation in areas contaminated with atomic, biological or chemical war materials, comprising multisectional vehicle body means, including driver compartment body means, center body structure means and rear body structure means, said driver compartment body means including radio-communication means and measuring means for measuring the level of radiation prevailing on the outside of the driver compartment body means, said center body structure means including at least one control space means equipped with radiation measuring apparatus and at least one further space means separated from said control space means for the cleaning of persons and objects which have been exposed to radiation and contamination, each of said space means being provided with respective door means leading to the exterior of said vehicle body, and said rear body structure means being separated from the center body structure means and including at least one water tank means, pump means operatively connected with said water tank means and spaces for additional equipment, wherein said measuring means for measuring the radiation level prevailing on the outside of the driver compartment body means is constructed as a measuring probe adjustable from the interior of the driver compartment body means and pivotally arranged outside of the vehicle body, and further comprising decontamination spray means surrounding said measuring probe for effecting a spray-wash of said measuring probe and of the adjoining vehicle parts.

4. A special type vehicle according to claim 3, wherein the decontamination spray means is controllable from within the driver compartment body means.

5. A special type vehicle according to claim 3, further comprising water spray flushing means arranged at the front side of the vehicle for enabling a predecontamination and road decontamination.

6. A special type vehicle according to claim 5, wherein the water spray flushing means and the decontamination spray means for the measuring probe are operatively connected with said pump means.

7. A special vehicle for operation in areas contaminated with atomic, biological or chemical war materials, comprising multisectional vehicle body means, including driver compartment body means, center body structure means and rear body structure means, said driver compartment body means including radio-communication means and measuring means for measuring the level of radiation prevailing on the outside of the driver compartment body means, said center body structure means including at least one control space means equipped with radiation measuring apparatus and at least one further space means separated from said control space means for the cleaning of persons and objects which have been exposed to radiation and contamination, each of said space means being provided with respective door means leading to the exterior of said vehicle body, and said rear body structure means being separated from the center body structure means and including at least one water tank means, pump means operatively connected with said water tank means and spaces for additional equipment, further comprising water spray flushing means arranged at a front side of the vehicle and operatively connected with said pump means for effecting a predecontamination and road decontamination in the vecinity of the vehicle.

8. A special vehicle for operation in areas contaminated with atomic, biological or chemical war materials, comprising multisectional vehicle body means, including driver compartment body means, center body structure means and rear body structure means, said driver compartment body means including radio-communication means and measuring means for measuring the level of radiation prevailing on the outside of the driver compartment body means, said center body structure means including at least one control space means equipped with radiation measuring apparatus and at least one further space means separated from said control space means for the cleaning of persons and objects which have been exposed to radiation and contamination, each of said space means being provided with respective door means leading to the exterior of said vehicle body, and said rear body structure means being separated from the center body structure means and including at least one water tank means, pump means operatively connected with said water tank means and spaces for additional equipment, said water tank means including a tank containing potable water and a tank containing nonpotable water, wherein the tank containing nonpotable water is connected with the tank containing potable water by way of a suction line, a pump and filter means for water purification, so that the tank containing potable water can be filled from the tank containing nonpotable water with water which has been purified.

9. A special vehicle for operation in areas contaminated with atomic, biological or chemical war materials, comprising multisectional vehicle body means, including driver compartment body means, center body structure means and rear body structure means, said driver compartment body means including radio-communication means and measuring means for measuring the level of radiation prevailing on the outside of the driver compartment body means, said center body structure means including at least one control space means equipped with radiation measuring apparatus and at least one further space means separated from said control space means for the cleaning of persons and objects which have been exposed to radiation and contamination, each of said space means being provided with respective door means leading to the exterior of said vehicle body, and said rear body structure means being separated from the center body structure means and including at least one water tank means, pump means operatively connected with said water tank means and spaces for additional equipment, said water tank means including a tank including potable water and a tank containing nonpotable water, wherein each of said tanks is provided with a venting connecting piece communicating with the atmospheric air and with a distributor means connected with a respective tank, said distributor means being provided with filter means for the decontamination of the air entering said tanks.

10. A special vehicle for operation in areas contaminated with atomic, biological or chemical war materials, comprising multisectional vehicle body means, including driver compartment body means, center body structure means and rear body structure means, said driver compartment body means including radio-communication means and measuring means for measuring the level of radiation prevailing on the outside of the driver compartment body means, said center body structure means including at least one control space means equipped with radiation measuring apparatus and at least one further space means separated from said control space means for the cleaning of persons and objects which have been exposed to radiation and contamination, each of said space means being provided with respective door means leading to the exterior of said vehicle body, and said rear body structure means being separated from the center body structure means and including at least one water tank means, pump means operatively connected with said water tank means and spaces for additional equipment, and further comprising lead container means, means for dispensing isotopes into said lead container means and a steel container secured at the vehicle, wherein said lead container means is displaceably arranged on glide rails.

References Cited

UNITED STATES PATENTS

| | | | |
|---|---|---|---|
| 2,891,662 | 6/1959 | Frost | 296—1X |
| 1,796,112 | 3/1931 | McArthur | 296—23 |
| 2,826,785 | 3/1958 | McCanless | 296—23X |
| 3,000,665 | 9/1961 | Reeves | 296—24 |
| 3,163,434 | 12/1964 | Krueger | 296—24X |
| 2,185,209 | 1/1940 | Love | 296—24 |
| 2,976,423 | 3/1961 | Prest | 250—108X |
| 3,005,105 | 10/1961 | Lusk | 250—108 |
| 3,256,440 | 6/1966 | Stark | 250—108FS |
| 3,319,067 | 5/1967 | Joffe | 250—106S |
| 613,296 | 11/1898 | Ober | 239—159 |

OTHER REFERENCES

U.S. Civil Defense: "Health Service & Special Weapons Defense," December, 1950, pp. 151 and 155.

PHILIP GOODMAN, Primary Examiner

U.S. Cl. X.R.

250—108